Figure 1:
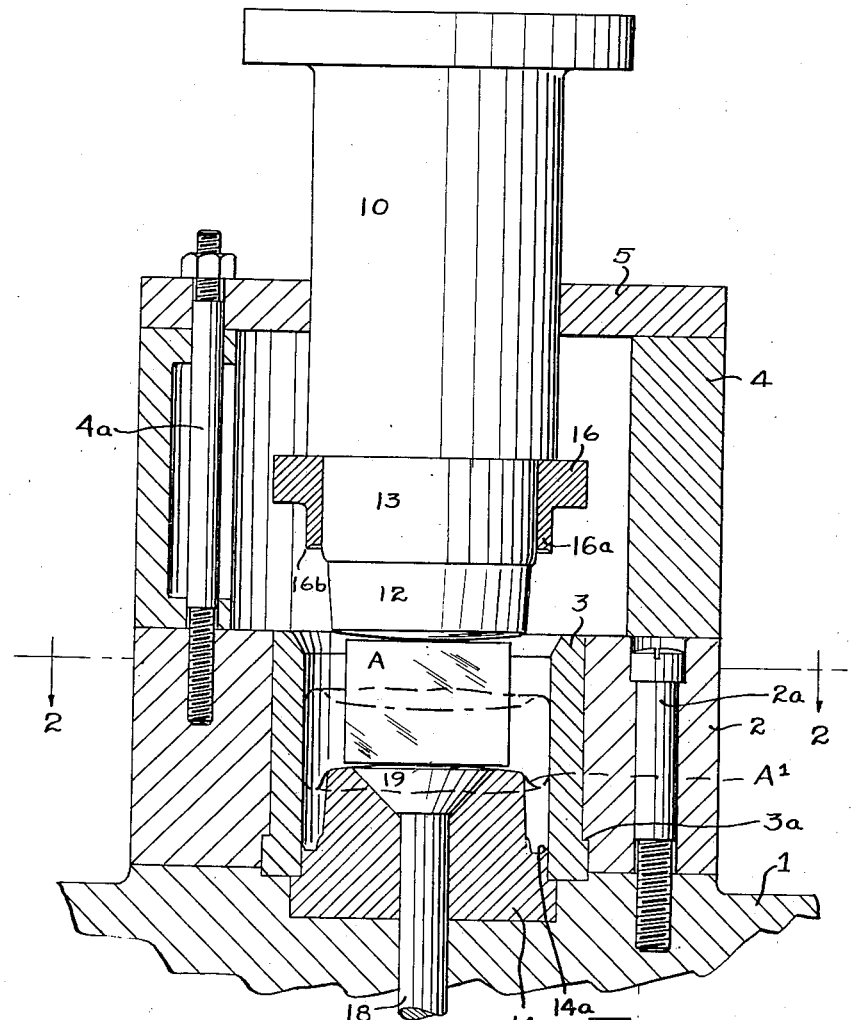

April 29, 1930.  H. WOODHEAD  1,756,416
PROCESS FOR MAKING PIPE COUPLINGS
Filed Nov. 28, 1924  3 Sheets-Sheet 1

Inventor
Harry Woodhead
By Bates, Macklin,
Goldrick & Teare
Attorneys

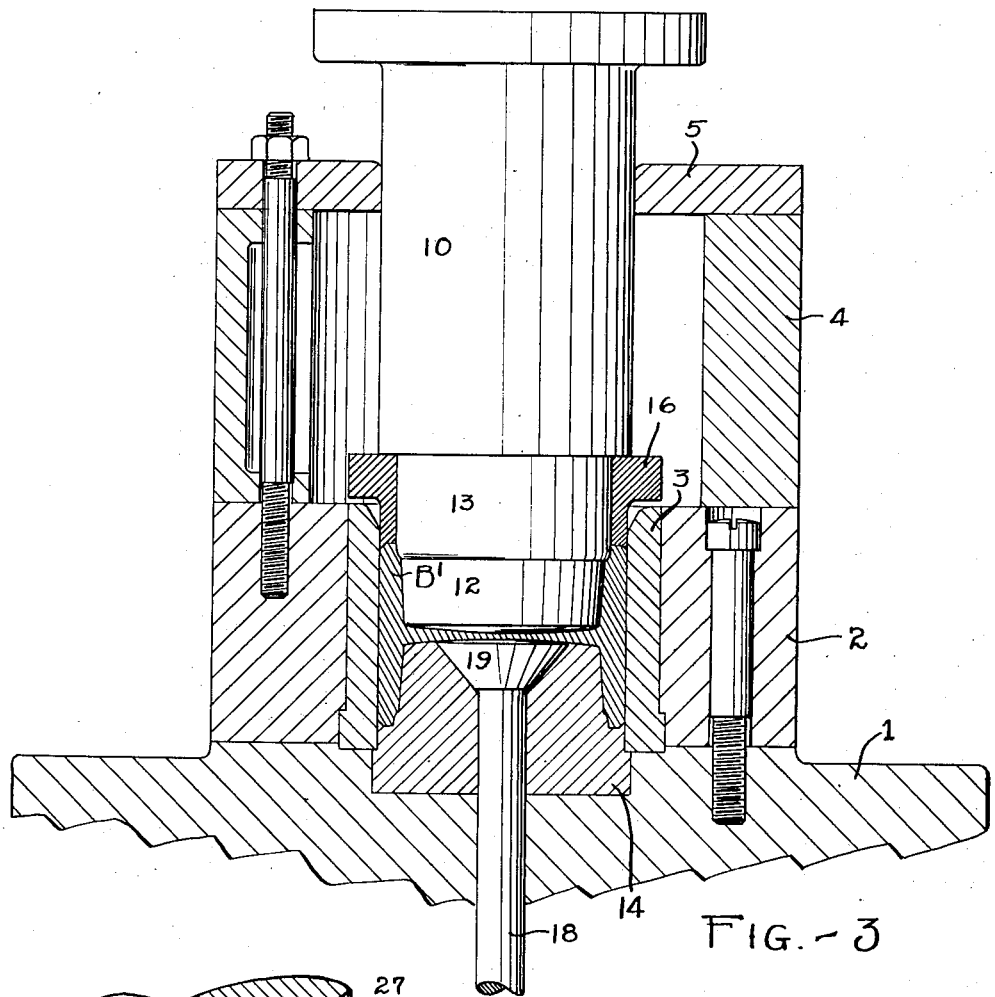
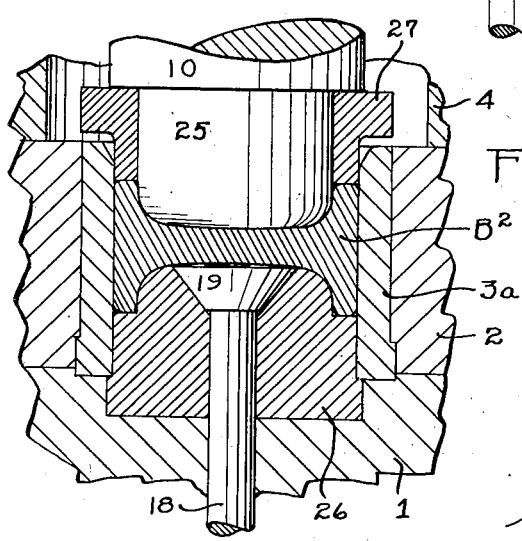

April 29, 1930.   H. WOODHEAD   1,756,416
PROCESS FOR MAKING PIPE COUPLINGS
Filed Nov. 28, 1924   3 Sheets-Sheet 3

Inventor
Harry Woodhead
By Bates, Macklin,
Goldrick & Teare
Attorneys

Patented Apr. 29, 1930

1,756,416

UNITED STATES PATENT OFFICE

HARRY WOODHEAD, OF CLEVELAND, OHIO, ASSIGNOR TO THE MIDLAND STEEL PRODUCTS COMPANY, OF CLEVELAND, OHIO, A CORPORATION OF OHIO

PROCESS FOR MAKING PIPE COUPLINGS

Application filed November 28, 1924. Serial No. 752,610.

The essential object of this invention is to provide a simple efficient and highly practical method of producing a finished blank for large pipe couplings by press forging operations, so carried out that the blank so formed may be threaded without preliminary machine-cutting operations.

Other objects of my invention include principally the elimination of difficulties encountered in the various prior methods of manufacture of such pipe couplings whereby my process enables the making of large blanks accurate enough to be threaded without machine operations, and of the proper material to give the desired strength and capable of being easily threaded and yet presenting accurate and strong threads in the finished article.

The present process is distinguished in improved steps as will hereinafter appear from methods previously used and is particularly useful in the manufacture of large couplings wherein the savings and advantages of the present invention become most apparent. By large couplings I refer to pipe couplings varying from say 6" in diametaer up to 20" or more. The previous methods include the drawing of steel blanks forming cups or cylinders, billet piercing operations, welding of flat strips bent into cylinders and others, whereas the present method is entirely a press forging operation allowing the selection of material and the completion of an article that is a blank having the characteristics outlined in the above objects and none of the disadvantages of the methods heretofore used and having superior characteristics as a finished article over any coupling blanks previously made.

More specifically by the use of my process I am enabled to complete the accurate formation of the blank tapered each way from the center having cylindrical exterior surface concentric therewith, leaving a central disc or diaphragm, and one of the advantages of the process is that I am enabled to remove this diaphragm by a simple punching operation leaving a short interior cylindrical surface of the same diameter as the adjacent small ends of the tapered surface. The selection of the material for forging specifically includes that of ductility, tensile strength, stiffness and best thread cutting quality.

The further objects and advantages of my invention will become apparent in connection with the following description which relates to the drawings illustrating the carrying out of my process, and the essential characteristics of the present invention are summarized in the claims.

Figure 2:
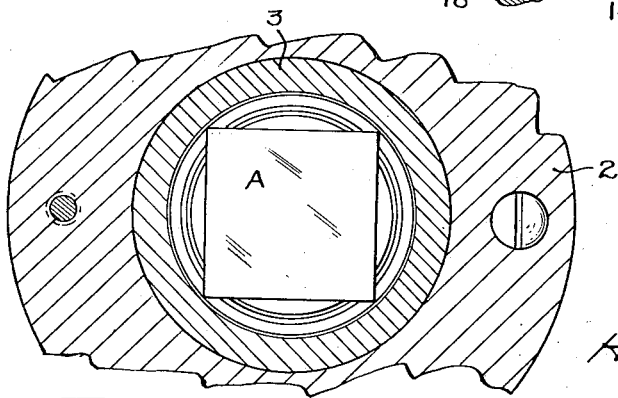
Figure 5:
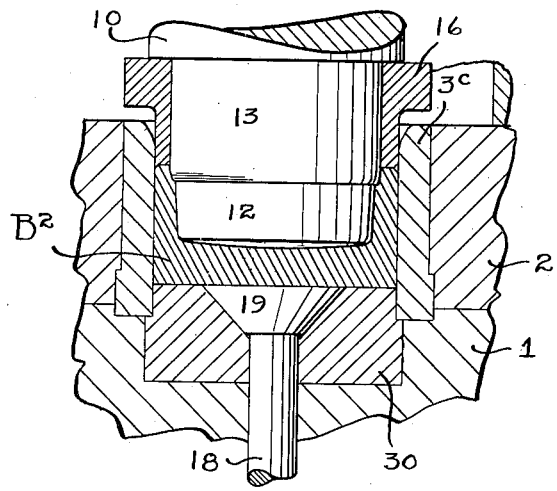
Figure 6:
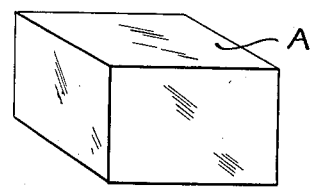
Figure 7:
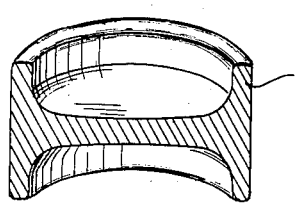
Figure 8:
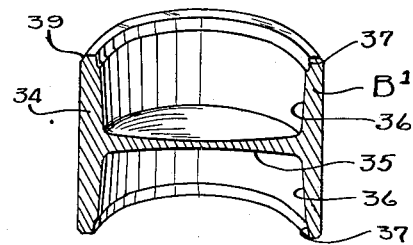
Figure 9:
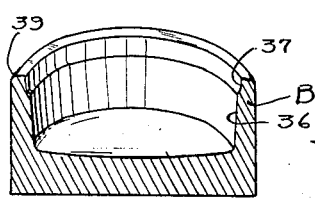
Figure 10:
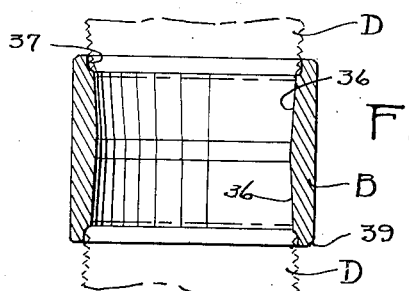

In the drawings, Fig. 1 is a sectional view of the press and die members showing the initial operation on a billet, an intermediate step being indicated in broken lines; Fig. 2 is a horizontal section taken along the lines 2—2 of Fig. 1; Fig. 3 is a sectional view similar to Fig. 1 with the die members shown as in position of finishing the press forging of the blank; Fig. 4 illustrates an intermediate step found desirable in forming some of the larger sizes of blanks; Fig. 5 is a view of the essential parts of Fig. 1 with a die first forming one side of the blank which may be subsequently formed on the other side as in Fig. 3; Fig. 6 illustrates a suitable slug or billet; Fig. 7 is a sectional perspective view illustrating the blank after a preliminary press forging step; Fig. 8 is a sectional perspective after the forging steps are finished; Fig. 9 is a similar view showing the result of the intermediate step formed as shown in Fig. 3; Fig. 10 is a sectional view of the finished blank with the central diaphragm or disc removed and illustrating the threading of the coupling.

Referring more in detail to the drawings, and indicating the various parts by reference characters, 1 represents the base of a heavy powerful press which it may be assumed operates with a comparatively rapid movement though not striking a blow. A cylindrical die member 2 suitably secured to the base as by screws 2ª should have cylindrical tough steel lines 3 shouldered at 3ª to hold it in position. Suitably held concentric with this die member 3 and shown as resting within a recess in the upper face of the base or bed 1 is a die 14, the upper portion of which as shown in this figure is substantially the same shape exteriorly as the interior of one end of the finished forging. This shape will be referred to later in reference to Figs. 6 to 10.

An ejector member 18 is shown as having a conical head 19 with its surface crowned and continuous with the top surface of the die 14.

For guiding the plunger 10, I have shown an open frame 4 surmounting the member 2 which frame is in turn surmounted by a stripper plate 5 having a central opening directly above and concentric with the die just described. The plunger 10 projects through the opening in the stripper plate and carries the male die 13 conforming to the desired shape of the interior of the tapered wall of the blank to be forged. The frame may be secured upon the ring member 2 by double ended studs 4$^a$.

Carried on the member 10 and embracing the portion 13, is a flanged guiding and centering member 16, the lower end of which is adapted to enter and fit into the female die 3.

I have found that by using a billet such as shown in Fig. 6, in the form of a substantially square block of a height to afford the desired amount of metal that it tends to approximately center itself in the die as shown in Fig. 2. A flattened circular billet substantially filling the female die would have the same effect of approximately centering the material in the die. This results in a more even distribution of the flowing metal when being acted upon by the dies.

The finished blank shown in Fig. 8 comprises the cylindrical walls 34 formed by the conical depressions 36, which terminate in the web or diaphragm 35, comparatively thin at its center and somewhat thicker where it joins the side walls. At the margin of the recess, I have shown chamfers 37 in connection with threading the finished coupling. The manner of finishing the forging includes punching out the diaphragm to diameter such as to leave a surface meeting the inner ends of the tapered surfaces 36. I consider it within the scope of my invention to form the blank of Fig. 8, by one or more variations of the series of steps of my process.

From the heated billet, I may form the completed forging shown in Fig. 8 with one downward movement of the die 10, causing the billet to first take the form shown at A$^2$ in Fig. 1, where the sleeve 16$^a$ of the aligning member 16 is just entering the cylindrical portion of the ring 3. A further inward movement of the plunger results in the complete flowing of the metal into the remaining cavity as at $b'$ in Fig. 3. When forming large coupling blanks in this manner, the pressure set up in die 3 is very great and a large amount of power is required. This may be relieved somewhat by forming the blank in the two steps. Referring to Figs. 5 and 9, the die 14 is replaced by a substantially flat die 30, on which the billet may be placed and in one press stroke formed at one end substantially completely as shown in Fig. 9 with the web or base still comparatively thick. This partially formed blank may then be taken out and placed in another press with its flange embracing a finishing die such as 14 in Fig. 1, the plunger 10 now being forced downwardly as before to form the other end of the coupling.

Another variation of this method illustrated by Figs. 4 and 7 includes first acting upon billet by more rounded male dies as indicated at 25 and 26. A shorter guiding ring is here used as shown at 27. The result of forcing this plunger down is to form the shallow double cup shell B$^2$ about as shown in Fig. 7, having a thick web whose metal is later caused to flow into the deeper double cup of the complete forging shown in Fig. 8.

If desired, I may form the marginal bevel on either end of the completed forging as shown in Fig. 8 by providing a lip 16$^b$ on the lower end of the aligning ring 16, and a similar lip or rib 14$^a$ on the member 14 as shown.

From the foregoing description, it will be seen that I have evolved a practical process for the formation of blanks capable of being finished by the mere punching out of the transverse web and which when so finished, forms an accurate and complete article ready to be threaded along the tapered surfaces. These surfaces of course, are tapered coincident with standard pipe thread taper. The use of this process assured a very accurate co-axial alignment of these two tapers which as previously set out, is very essential.

The process differs from the well known methods of billet piercing for the formation of ordnance shells, car wheel axles and the like, in that the finishing dies are required only to cause the metal to flow into the complete form of wall while maintaining this true alignment, and the first step of the forming of the billet is such as to cause a substantially uniform radial flow of the metal until it meets the cylindrical wall of the die and thereafter it flows substantially evenly along the tapered surfaces of the male die members. The starting of this flow evenly in all directions and the preventing of its forming eccentric flanges or walls at any time, is as stated very essential and has been successfully accomplished in the making of these large blanks, by the use of a powerful press and an apparatus substantially as shown in the drawings.

The original formation of the walls of the double cup, later becoming the substantially cylindrical blank, with the exact taper being formed as the metal flows has proven successful, whereas to later put in this taper by a press forming or forging operation has been found extremely difficult or impossible, and otherwise, it is necessary to treat the blank with machine cutting operations which are of course, comparatively expensive.

To prevent the shaped metal sticking to the die parts and to facilitate the ejection of the formed article from the die, the usual treatment of applying heavy oil or carbon coal dust to the surface, as is used in cup and tube drawing operation, may of course be employed in my process whenever found desirable.

The action of the bringing together of the dies in such a press as mentioned, should not necessarily be with the need of a blow as in a drop hammer or rapidly acting hammer operation, but preferably a heavy power press is used, slow enough of motion to start the metal to flowing with its great power of compression, and the motion should then be continued throughout the forming step. If a preliminary forming step be used as described, the partially formed blank should be transferred to the finishing dies quickly enough to insure the blank remaining still hot enough to flow under the pressure used, thus avoiding necessity for any reheating. In practice, I have found that this may be actually accomplished.

It is to be understood that variations in the particular nature of the steps of this invention either in the process or in the use of an apparatus of different form, may be included within the spirit of my invention, and I do not wish the present invention to be limited to unessential details.

I claim:—

1. The process of forming large pipe couplings having inside tapered wall conforming to the pipe thread taper, consisting of heating a metal billet, placing the billet within a cylindrical female die and squeezing it between a pair of accurately aligned male dies so shaped as to first squeeze the center of the billet, forcing the metal laterally and radially, stopping the lateral flow by the cylindrical surface of the female die and turning metal outwardly along the conical sides of the male dies and continuing this squeezing until the space between the male and female dies are substantially filled and thereafter shearing out the web between the tapered surfaces thus formed on the interior of the double cupped wall leaving a substantially cylindrical member with the taper as described.

2. A process of forming large pipe coupling blanks comprising heating a steel billet, placing the same in a cylindrical die leaving a space between the billet and cylindrical die and bringing together upon it with very high pressure male dies to force the billet into a cylindrical exterior formation having flanges with tapered inner surfaces and leaving a transverse web, thereafter punching out the transverse web to a diameter equal to the smaller ends of the tapered surfaces, the dies being accurately guided during the pressing together operation, in order to accurately align the axes of the interior surfaces of the blank.

3. A process of die forging a large pipe coupling blank having substantially cylindrical exterior and inwardly tapering interior surfaces in accurate axial alignment and truly concentric with the exterior, consisting of heating a billet having slightly more metal than the finished article, placing the same in a cylindrical die the billet being smaller in cross section than the interior of the die and bringing a pair of metal dies together upon said billet under great pressure while accurately centering them with relation to the cylindrical die to partially complete the blanks, then using similar dies bringing the male dies together to accurately complete the exterior wall and tapered surfaces extending each way from the middle of the blank and leaving a transverse web and thereafter removing the transverse web by a punching operation without disturbing the tapered surfaces.

4. A process of die forging a blank for large pipe couplings with accurate finish tapered surfaces ready for threading, consisting of placing a heated steel blank in a cylindrical die substantially larger than the exterior of the blank, then, bringing male die members together upon the blank to spread the metal and cause it to flow first outwardly then along the surface of the cylinder in flange-like formation leaving a comparatively thick web between the male dies, then causing additional metal to flow from the web into spaces of finishing dies to complete the formation of the tapered walls both ways from the web, and thereafter removing the web along an inner cylindrical surface meeting the small ends of the tapered surfaces.

5. A process of forming large pipe couplings comprising heating a metal billet to a very high temperature, placing this billet within a female die large enough to leave a considerable space around the billet and squeezing the billet between a pair of male dies while accurately maintaining alignment of the male dies and concentricity within the female die, forcing the metal first laterally against the cylindrical surface within the female die and then continuing the forcing, causing the metal to flow longitudinally, forming a double skirted cylindrical member having a central web and interior surfaces tapered each way from said web and thereafter shearing out the web flush with said surfaces, and finally threading each of the tapered surfaces of the blank so formed.

6. The method of forming a finished blank for pipe coupling, adapted to be taper threaded at either end, comprising heating a metal billet of such a size that it may substantially center itself within a cylindrical die and still leave space at the sides of the billet, then forcing a male die member into the billet and causing the metal to flow laterally and longitudinally along the male die, and simultaneously aligning the male die with the cylindrical member to secure concentricity of the cavities to be formed in either end of the blank by the male die, removing the completed blank from the cylindrical die and shearing the web formed between the opposed cavities.

7. The method of forming a finished blank for a pipe coupling adapted to receive the usual tapered threads comprising heating a rectangular metal billet, placing the billet within a female die having a cylindrical wall of such size that the corners of the billet substantially center the billet in the die, then forcing male die members against the billet, thereby causing the metal to flow laterally toward the wall and uniformly longitudinally along the male die to form a tapered inner wall on one end of the blank, likewise forming a similar tapered wall on the other end of the blank leaving a web of metal separating the cavities included within said tapered walls and finally removing said web.

8. The method of making a pipe coupling, comprising the working of a solid billet between male and female dies until it has oppositely tapered interior surfaces separated by a thin web in contiguous relationship to the male dies, and thereafter removing the web, and threading the tapered surfaces.

9. The method of making pipe couplings, comprising taking a solid billet, working the metal outwardly and laterally from the center of the billet and in a converging direction toward the center of the billet, whereby the interior part of the article is oppositely tapered for substantially half the length of the article, such tapered portion being separated by a thin web of metal, and thereafter removing the web and threading the tapered surfaces.

In testimony whereof, I hereunto affix my signature.

HARRY WOODHEAD.